United States Patent
Fox et al.

(10) Patent No.: US 6,654,850 B2
(45) Date of Patent: Nov. 25, 2003

(54) PARAMETRIC OPTIMIZATION OF A DISC DRIVE THROUGH I/O COMMAND SEQUENCE ANALYSIS

(75) Inventors: Travis D. Fox, Edmond, OK (US); Stephen R. Cornaby, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 145 days.

(21) Appl. No.: 09/966,461

(22) Filed: Sep. 28, 2001

(65) Prior Publication Data

US 2002/0174293 A1 Nov. 21, 2002

Related U.S. Application Data

(60) Provisional application No. 60/278,832, filed on Mar. 26, 2001.

(51) Int. Cl.$^7$ ............................................. G06F 12/00
(52) U.S. Cl. ............................. 711/111; 710/15; 714/39
(58) Field of Search .................. 711/111; 702/179–186; 703/2–21; 710/8–36, 107, 263; 714/1–47, 718; 717/116–140

(56) References Cited

U.S. PATENT DOCUMENTS

| | | |
|---|---|---|
| 5,088,058 A | 2/1992 | Salsburg |
| 5,408,634 A | 4/1995 | Joho |
| 5,446,874 A | 8/1995 | Waclawsky et al. |
| 5,452,440 A | 9/1995 | Salsburg |
| 5,726,913 A | 3/1998 | Grimsrud |
| 5,752,038 A | 5/1998 | Blake et al. |
| 5,790,425 A | 8/1998 | Wagle |
| 5,819,112 A | 10/1998 | Kusters |
| 5,913,073 A | 6/1999 | LeCrone |
| 5,923,867 A | 7/1999 | Hand |
| 5,930,497 A | 7/1999 | Cherian et al. |
| 5,953,689 A | 9/1999 | Hale et al. |
| 6,002,872 A | 12/1999 | Alexander, III et al. |
| 6,035,378 A | 3/2000 | James |
| 6,145,121 A | 11/2000 | Levy et al. |
| 6,260,113 B1 | 7/2001 | Cherian et al. |

*Primary Examiner*—Nasser Moazzami
(74) *Attorney, Agent, or Firm*—Fellers, Snider, et al.

(57) ABSTRACT

Method and apparatus for improving data transfer rate performance of a disc drive configured to store data from a host device in physical data blocks identified by the host device in terms of logical block addresses (LBAs). A sequence of input/output (I/O) commands is provided to the disc drive each directing the transfer of data between at least one LBA within the disc drive and the host device. The correlation between the time sequence of the I/O commands to the locations of the physical data blocks corresponding to the LBAs accessed by the I/O commands is obtained, and preferably displayed graphically in a three-dimensional histogram showing physical data block accesses by time and by frequency. At least one data transfer parameter of the disc drive is thereafter adjusted in relation to the physical operations of the drive in response to the I/O command sequence.

17 Claims, 5 Drawing Sheets

PARAMETRIC OPTIMIZATION OF A DISC DRIVE THROUGH I/O COMMAND SEQUENCE ANALYSIS

RELATED APPLICATIONS

This application claims priority to U.S. Provisional Application No. 60/278,832 filed Mar. 26, 2001.

FIELD OF THE INVENTION

The claimed invention relates generally to the field of disc drive data storage devices and more particularly, but not by way of limitation, to a method and apparatus for optimizing the operational parametric configuration of a disc drive through analysis of the locations of physical data blocks accessed during an input/output (I/O) command sequence from a host device.

BACKGROUND

A disc drive is a data storage device used to store digital data. A typical disc drive includes a number of rotatable magnetic recording discs which are axially aligned and mounted to a spindle motor for rotation at a high constant velocity. A corresponding array of read/write heads access fixed sized data blocks (sectors) on tracks of the discs to write data to and to read data from the discs.

Disc drives are provided with servo control circuitry to move the heads to the various tracks, read/write channel circuitry to write data to and read data from the discs, and interface control circuitry to facilitate communication and data transfer with a host device. A disc drive is typically configured to operate in accordance with an industry standard interface protocol, such as Small Computer Systems Interface (SCSI). Communications and data transfers are carried out between host and drive in accordance with this protocol.

Over the past several years, benchmark software applications ("benchmarks") have been developed and used to evaluate the operational performance of various aspects of a computer system, such as the host processor (CPU), video accelerator boards, and disc drives. Such benchmarks allow comparison of performance among various product offerings from different competing manufacturers. For example, WINBENCH® software, commercially available from eTesting Labs, Inc., Morrisville, N.C., USA, includes the capability of executing a predetermined input/output (I/O) command sequence to a drive and measuring the response of the drive. The software reports various results such as average data transfer rate (in megabytes per second), average access time (in milliseconds), and host processor utilization (the smaller the better).

While such benchmarks are useful in providing global assessment of the performance of a disc drive, such benchmarks are not particularly helpful with regard to efforts to parametrically optimize the drive. This is because there are many factors that can affect the data transfer performance of a disc drive, including the particular I/O command sequence itself.

Disc drives of the present generation typically accommodate command caching, which allows multiple I/O commands to be received in a command queue and executed by the drive in an order different than that received. SCSI drives can store up to 64 pending commands in the command queue. A search strategy is used to execute the commands in an order that will provide the highest transfer rate. For example, if several commands require access to data blocks close to the current position of the heads, and other commands require access to data blocks at a distant location on the discs, the drive may proceed to execute all of the local accesses before moving the heads to the distant location and accessing the data blocks at the distant location to minimize seek time (i.e., time spent moving from one track to the next).

The time required for a particular data block to rotate around and reach the head (latency) is an important factor when selecting the execution order, as delays in waiting for the disc to rotate significantly decrease the resulting transfer rate. Selection of the execution order typically includes estimating how much time it would take to reach each of the data blocks associated with the pending access commands based on latency and the time required to perform any necessary head switches and seeks.

A disc drive can typically further employ various run-time selectable strategies (parameters) that can significantly affect data transfer performance, such as write caching, read on arrival (ROA) and read look ahead (RLA). Write caching involves delaying the writing of data received from the host in favor of execution of other previously requested accesses (as opposed to immediately writing the data upon receipt). ROA and RLA generally entail reading data blocks and placing the contents into the data buffer even though the host has not specifically requested the data from such data blocks, on the basis that the host may request the data in the near future.

ROA involves performing a seek command to move the head to a destination track on which a target data block resides, and commencing to read the preceding data blocks on the track until the target data block reaches the head. By contrast, RLA involves receiving a command to move to a new target track, but because the target data block is a large angular distance away from the head, the drive delays seeking to the new track and instead maintains the head on the current track and reads additional data blocks on the current track before moving to the destination track and reading the target data block. The foregoing strategies can provide improved performance under certain circumstances, such as video streaming applications. However, if the I/O command sequence is substantially random, the operation of these parameters can actually degrade the data transfer performance of the drive since a large amount of nonrequested data is moved to the buffer.

Existing methodologies of tracking disc drive transfer performance (such as benchmarks) generally focus on elapsed time required to complete each access. While this average timing information may help a disc drive designer or user classify the current operational level of the drive ("good," "not so good"), it does not necessarily indicate what parametric changes could be made at particular locations within the drive to improve transfer performance, other than to suggest to the user to start changing various parameters in a "trial-and-error" approach and repeat the test.

Accordingly, there is a need for an improved analysis approach to enable a user to evaluate and optimize a disc drive by identifying the specific correlation between the requests for data at the host level and where the requested data are physically located on the discs, as well as the specific sequence in which the drive operates to service these requests. It is to such improvements that the present invention is directed.

SUMMARY OF THE INVENTION

In accordance with preferred embodiments, a disc drive is provided in communication with a host device and is configured to store data from the host device in physical data blocks on at least one disc surface. The physical data blocks are identified by the host device in terms of a corresponding sequence of logical block addresses (LBAs).

A method for increasing the data transfer performance of the disc drive comprises steps of providing input/output (I/O) commands to the disc drive as a sequence of data access operations, with each data access operation directing the transfer of data between at least one LBA within the disc drive and the host device. Communications from the disc drive to the host device are monitored as the I/O commands are provided to the drive.

The correlation between a time sequence of the I/O commands to the locations of the physical data blocks corresponding to the LBAs accessed by the I/O commands is next determined, and at least one data transfer parameter of the disc drive is adjusted in response to the correlation of time sequence and location of physical data blocks. Such data transfer parameters preferably include write caching, read on arrival (ROA) and read look ahead (RLA) settings.

The correlation preferably includes the generation of a three-dimensional histogram plotted against first, second and third orthogonal axes. The first orthogonal axis indicates locations of the physical data blocks, the second orthogonal axis indicates sample interval and the third orthogonal axis indicates frequency of accesses of the physical data blocks. In this way, the actual physical operations of the disc drive in response to the I/O command sequence can be determined, and the effectiveness of the various data transfer parameters in view of the sequence can be readily observed.

In a preferred embodiment, the monitoring of the communications from the disc drive is carried out using data acquisition circuitry resident on a printed circuit board within the host device.

In further preferred embodiments, a software routine is tangibly stored on a computer readable medium. The software routine is configured to be loaded into memory of the host device and to direct the host device to carry out the foregoing method steps.

These and various other features and advantages which characterize the claimed invention will be apparent from a reading of the following detailed description and a review of the associated drawings.

DETAILED DESCRIPTION

Figure 1:
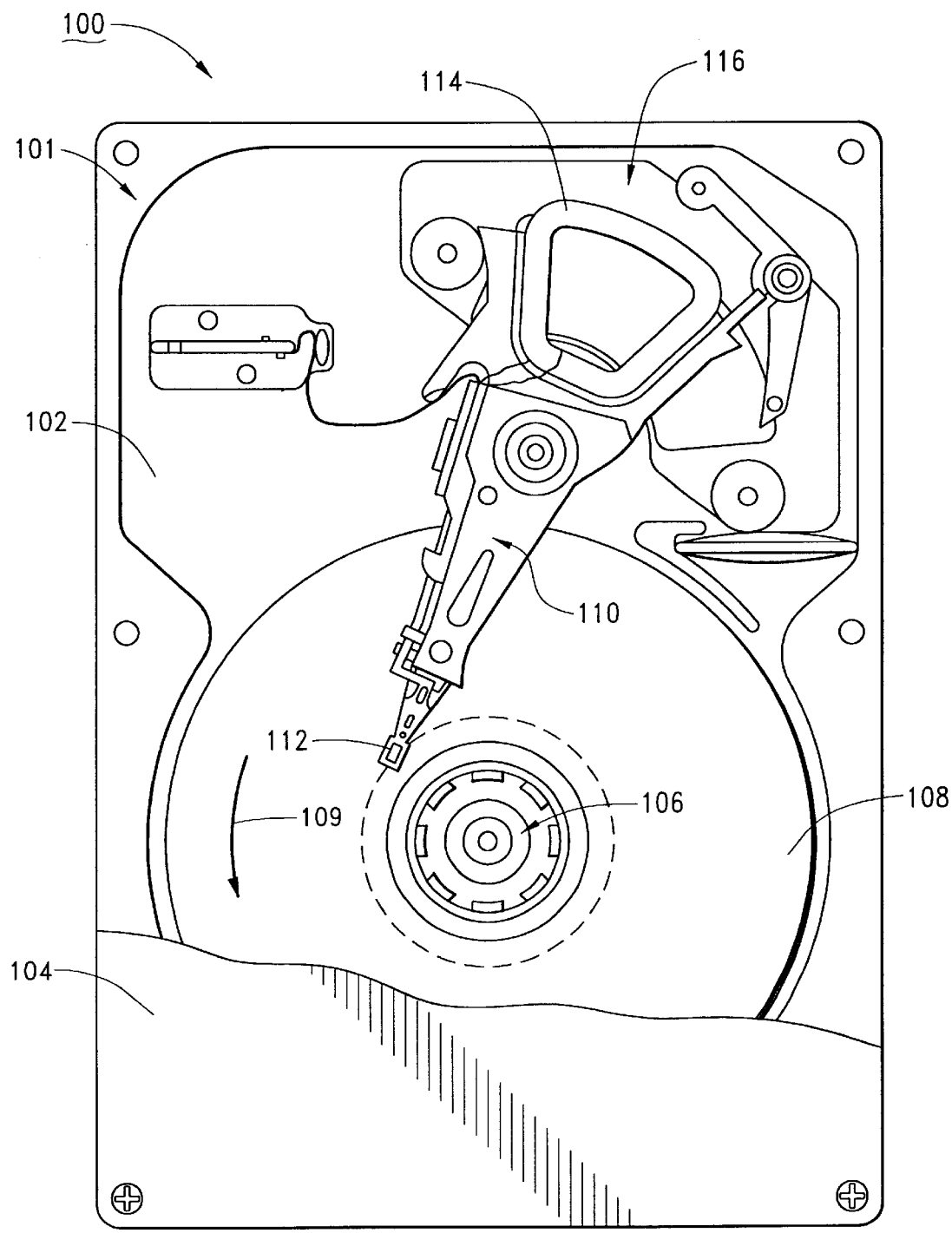
FIG. 1 is a top plan view of a disc drive constructed in accordance with preferred embodiments of the present invention.

FIG. 1 provides a top plan view of a disc drive data storage device 100 ("hard disc drive", or "HDD") constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 at a constant, high speed in rotational direction 109.

An actuator assembly 110 supports an array of read/write heads 112 adjacent the respective disc surfaces. The actuator assembly 110 is rotated through the application of current to an actuator coil 114 of a voice coil motor (VCM) 116. User data are stored in fixed size data blocks (sectors) on tracks (not shown) defined on the disc surfaces. All of the tracks on each of the disc surfaces at a given radius make up a cylinder.

Figure 2:
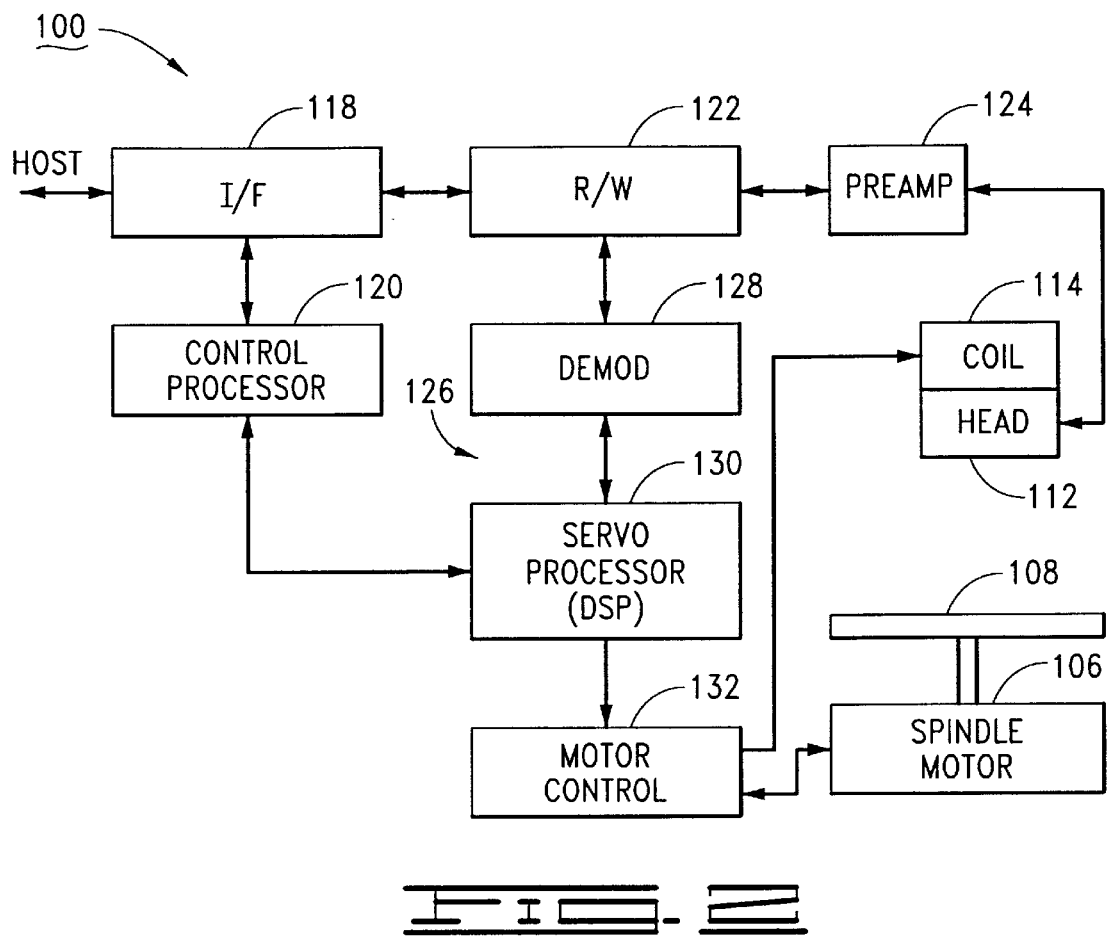
FIG. 2 provides a functional block diagram of the disc drive of FIG. 1.

FIG. 2 provides a functional block diagram of the disc drive 100. FIG. 2 includes control circuitry provided on a disc drive printed circuit board (PCB) affixed to the underside of the HDA 101, and thus not visible in FIG. 1.

Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
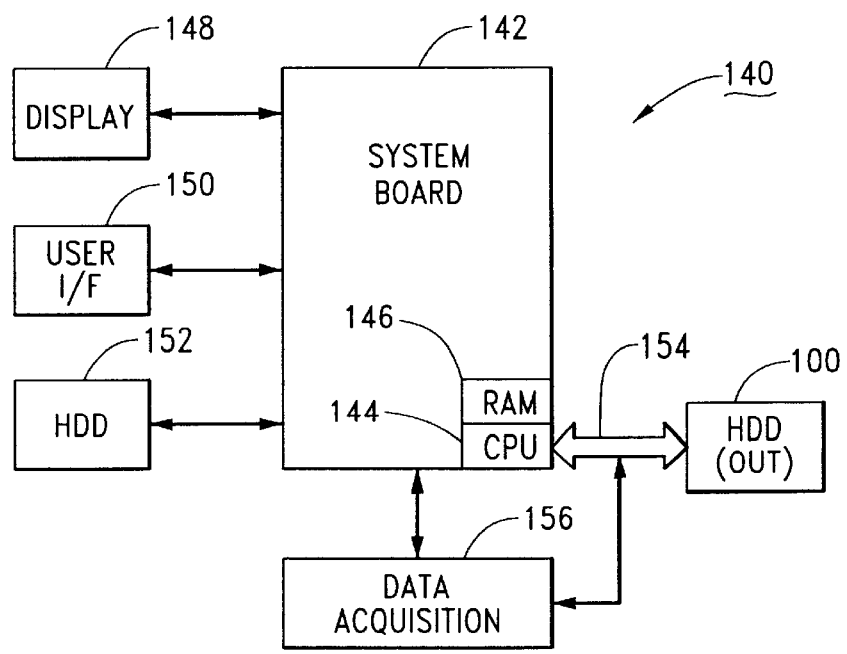
FIG. 3 provides a functional block diagram of an analysis system used to evaluate the disc drive of FIG. 1 as a device under test (DUT).

FIG. 3 provides a functional block diagram of relevant portions of an analysis system 140 (host device) used to evaluate the disc drive 100 as a device under test (DUT) in accordance with preferred embodiments of the present invention. The system 140 preferably comprises a computer workstation and includes a system board 142 (motherboard), central processing unit (CPU) 144 and associated random access memory (RAM) 146. A display 148 such as a cathode-ray tube (CRT) monitor enables a user to view analysis results, as discussed below. User input devices such as a keyboard and mouse are collectively represented by user I/F block 150. The system 140 includes an internal disc drive (HDD) 152, which may or may not be nominally identical to the disc drive 100 of FIG. 1.

The system 140 communicates with the disc drive 100 via a command bus 154. For purposes of discussion, it is contemplated that this bus is configured in accordance with the Small Computer Systems Interface (SCSI) interface protocol, although such is merely for illustration and is not limiting. In a preferred embodiment, the system further includes a data acquisition board 156 which is coupled to the system board 142 and operates as a bus analyzer to monitor I/O commands and data passed between the system 140 and the disc drive 100 along the bus 154.

As will be recognized, the system 140 identifies the available data storage of the disc drive 100 in terms of logical block addresses (LBAs). Each LBA corresponds to a particular data block (sector) at a physical block address (PBA) on the discs 108.

During a typical write operation in which the system 140 proceeds to store a computer file to the disc drive 100, the operating system of the system 140 employs a file allocation table (FAT) in RAM 146 to identify a corresponding number of LBAs in which the file is to be distributed. As will be apparent, a larger file will tend to require a larger number of LBAs to accommodate the file. The system 140 communicates a write command to the disc drive 100 and identifies the target LBAs to which the data are to be written. Typically, this communication will involve identification of the first LBA and the total number of LBAs required; since files are typically stored in successive LBAs, the drive can determine the actual LBAs to which the data are to be written.

The disc drive proceeds to convert the LBAs into the corresponding PBAs; that is, the drive identifies the sectors corresponding to the LBAs in terms of physical location (e.g., what track, angular position, and disc surface each LBA occupies). When write caching is off, the drive proceeds to move the associated head 112 to the target track containing the first LBA (first destination sector) and responds to the system 140 with a "ready" status. Note that if write caching is on, the drive proceeds to tell the system 140 that it is ready for the data even though the drive has yet to command movement of the appropriate head to the first destination sector.

Upon receipt of the ready status, the system 140 proceeds to transfer the data to be written into a buffer (not shown) in the I/F circuitry 118, and the disc drive 100 proceeds to write the data to the associated sectors, either immediately (write caching off) or on a scheduled basis (write caching on). It will be understood that activating write caching potentially results in the disc drive 100 servicing another data access operation before writing the data to the appropriate physical data blocks.

During a typical read operation in which the system 140 desires retrieval of a particular computer file previously stored to the disc drive 100, reference is once again made to the FAT to identify the associated LBAs. The system 140 issues a read command to the disc drive 100 which identifies the first LBA and the total number of successive LBAs to be retrieved. The disc drive 100 identifies the physical sectors corresponding to the LBAs and schedules the servicing of this read command ("selected read command") in conjunction with other pending commands in the command queue. When the disc drive proceeds to service the selected read command, the disc drive 100 moves the head(s) 112 to the associated sectors, transfers the data to the buffer, and then on to the system 140.

As discussed above, the disc drive 100 can store up to 64 pending I/O commands in a command queue. It is therefore contemplated that the system 140 will have multiple read and write commands pending at any given period of time. A command description block serves as a "tag" for each of the I/O commands so that both host and drive can keep track of what data and status communications are associated with each I/O command.

Figures 4, 5:
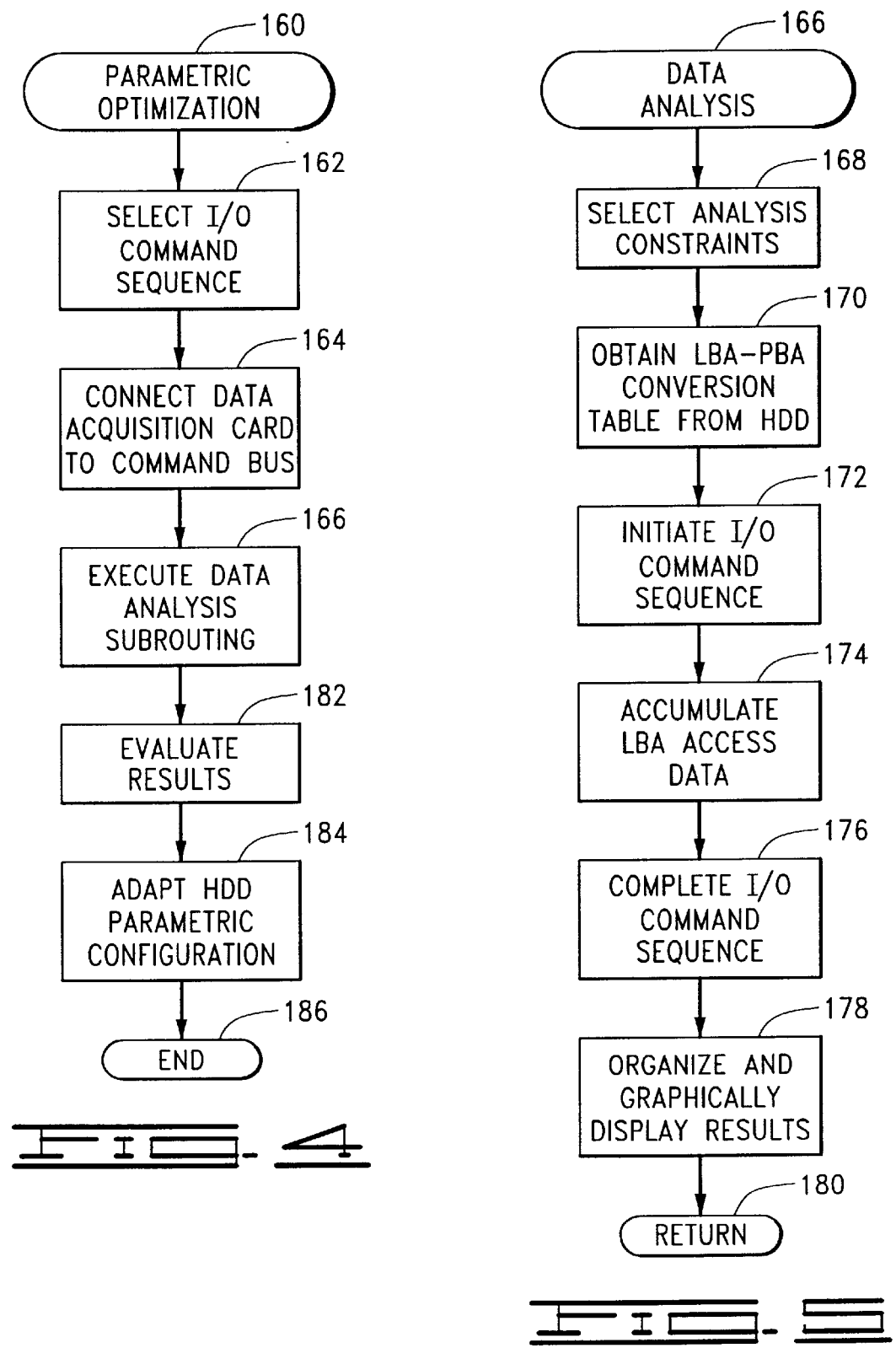
FIG. 4 is a flow chart for a PARAMETRIC OPTIMIZATION routine, illustrative of steps carried out in accordance with preferred embodiments to evaluate performance of the disc drive of FIG. 1 and to optimize run-time selectable parameters of the disc drive to improve data transfer performance.
FIG. 5 is a flow chart for a DATA ANALYSIS subroutine performed as a portion of the routine of FIG. 4 and representing a software routine resident in memory of the system of FIG. 3.

Having concluded a review of the system 140 of FIG. 3, reference is now made to FIG. 4 which provides a flow chart for a PARAMETRIC OPTIMIZATION routine 160, illustrative of steps carried out using the system 140 in accordance with preferred embodiments to optimize data transfer performance of the disc drive 100. It will be understood that the routine of FIG. 4 can be carried out during disc drive design operations or by an end-user during subsequent field utilization in a user environment.

At step 162, a particular I/O command sequence is selected. The I/O command sequence can comprise, for example, an existing industry recognized benchmark such as that provided by the aforementioned WINBENCH® software. The I/O command sequence can alternatively comprise a "real world" sequence obtained as the disc drive 100 is operated in a user environment over a specified period of time.

The data acquisition board 156 (FIG. 3) is connected to the command bus at step 164. At step 166, a DATA ANALYSIS subroutine is executed, as shown more fully by FIG. 5. The DATA ANALYSIS subroutine is preferably representative of software resident in the HDD 152 of the system 140 of FIG. 3 and loaded into RAM 146 during operation. As explained below, the DATA ANALYSIS subroutine preferably generates a three-dimensional graphical representation of the I/O sequence in terms of sequential LBA accesses by the disc drive 100.

The DATA ANALYSIS subroutine 166 proceeds with user-prompted requests for selection of analysis constraints at step 168. The requests are preferably displayed on the display 148 and the user makes selections via the user I/F 150. While a variety of analysis constraints can be used, Table 1 shows a preferred listing:

TABLE 1

| ANALYSIS CONSTRAINT | DESCRIPTION |
| --- | --- |
| Time Slice Interval | No. of commands/elapsed time per interval |
| LBA Bin Size | Histogram bucket size |
| LBAs to Persist | Duration of history to be displayed |
| LBA Range | Autoscale or user selected |
| Command Range | All commands, or only selected commands |
| LBA Weighting | Historical or Linear |

The following is a brief explanation of these constraints. Time slice interval is the number of commands, or optionally a specific amount of time in milliseconds, that is present between each analysis pass (during each analysis interval). LBA bin size is the histogram bucket size into which the LBA accesses are sorted. A histogram analysis of the command stream allows a smoother analysis of the access pattern and allows bin sizes to be set to the size of a track or cylinder, so that accesses can be visualized (and spatial locality analyzed) not only by the individual LBA, but on a track or cylinder basis as well.

The number of LBAs to persist is the size of the LBA history window to use when creating each access histogram at the appropriate time slice. This is what provides the "recent history" temporal locality dimension to the solution. The LBA range can be set in an autoscale mode which automatically sets the minimum and maximum range of the three-dimensional graphical chart to match those in the command stream. Alternatively, the LBA range can be user defined to allow the user to manually specify the starting and ending values in case extraneous LBA accesses wish to be avoided (i.e., FAT accesses, boot sector accesses, etc.).

The command range constraint allows the user to include all data access operations executed by the drive, to only include commands of a certain type (such as read operations), or only include commands issued during a benchmarked timed section (thereby excluding other types of accesses performed by the disc drive 100 during the test). The LBA weighting constraint allows the user to select whether to apply a historical weighting of the commands (linear (x)) or simply apply a constant weighting. The historical weighting results in a linear weighting of the LBA accesses, with the most recent one having the highest weight. The constant weighting applies essentially a moving average of all the LBAs during the analysis. Each weighting approach has advantages depending on the locality of the accesses and the desired three-dimensional graphical chart.

Returning to the routine of FIG. 5, the flow passes from step 168 to step 170 wherein an LBA-PBA conversion table is obtained from the disc drive 100. This enables the routine to correlate LBAs with physical sector locations.

The command sequence identified in step 162 is thereafter initiated at step 172, and the commands are sequentially tracked by the data acquisition board 156 during step 174. More particularly, the data acquisition board 156 proceeds to develop a database table in RAM 146 that identifies the command sequence and correlates this to the drive response. Write commands are tracked by issuance of the commands by the system 140 and the timing of the ready status responses by the disc drive 100; read commands are tracked by issuance of the commands by the system and the resulting transfer of data by the drive.

Once the I/O sequence concludes at step 176, the routine proceeds at step 178 to organize and display the results and the subroutine returns at step 180. The results are evaluated by the user at step 182, who implements desired changes in the parametric configuration of the drive at step 184. The routine then terminates at step 186. Each of these latter steps will now be discussed in detail.

Organization of the data involves accumulating all of the LBA accesses during each sample interval time-slice. The results can be displayed as a three-dimensional histogram plotted against three orthogonal axes, such as illustrated at 200 by the alternative views of FIGS. 6 and 7. For reference, the data in the histogram 200 represent the results of a benchmark test using the aforementioned WINBENCH® software.

The data in these figures are plotted against an LBA position x-axis 202, a sample (time) interval y-axis 204 and a number of LBA accesses z-axis 206. It will be noted that the histogram window was set to the width of each cylinder, so each individual peak represents accesses to the data sectors in a particular cylinder (all of the tracks at a given radius on the disc surfaces). Thus, the LBA x-axis 202 substantially indicates radius of the discs 108. Each slice along the sample y-axis 204 indicates the accesses that took place during each sample interval, with the oldest samples in back and the latest samples in front. The z-axis 206 indicates the time frequency of LBA accesses, with higher peaks indicating a larger number of accesses in a shorter amount of time.

Figure 6:
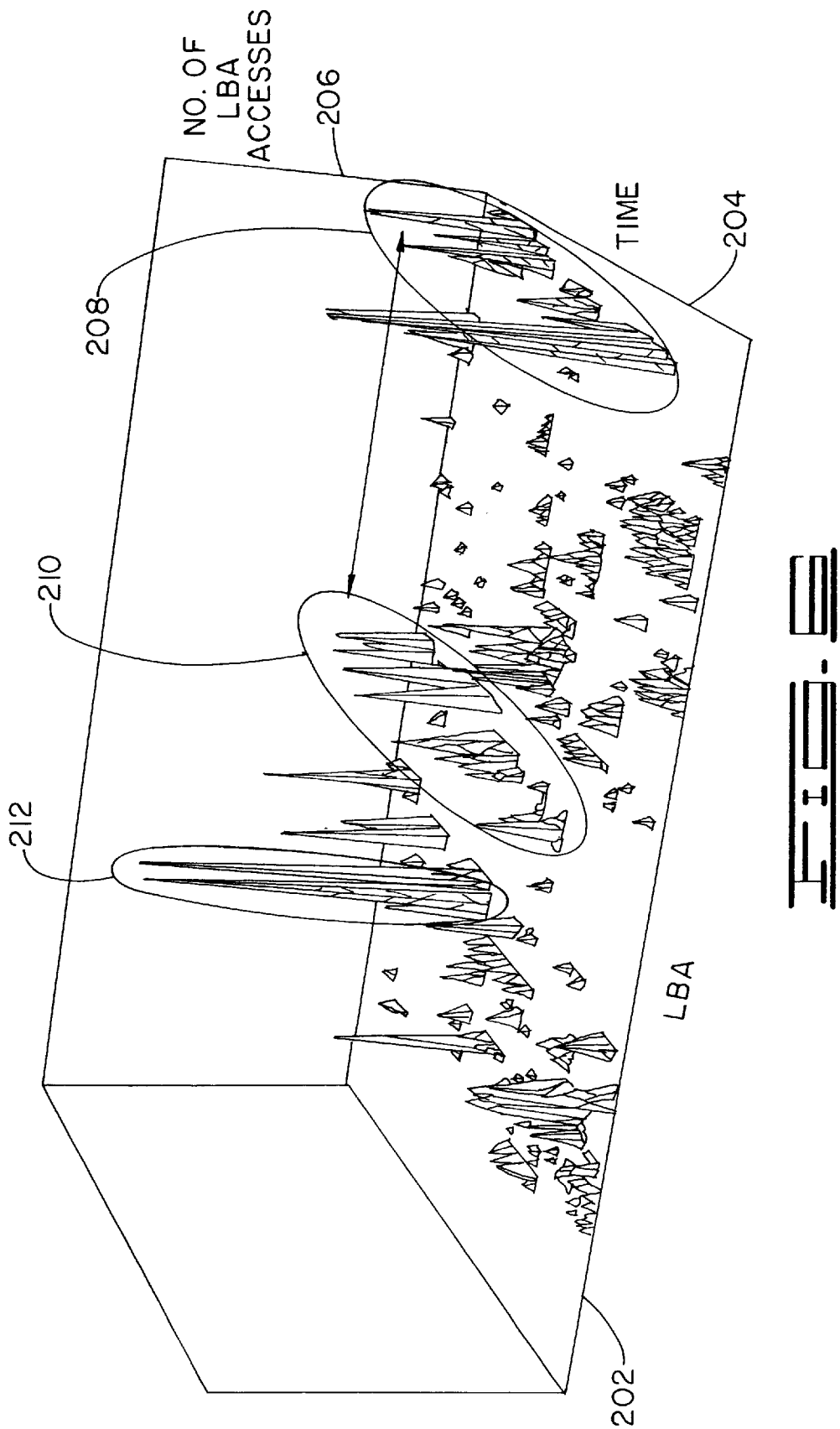
FIG. 6 is a three-dimensional graphical representation of data obtained from the subroutine of FIG. 4 aligned along a selected viewing angle.
Figure 7:
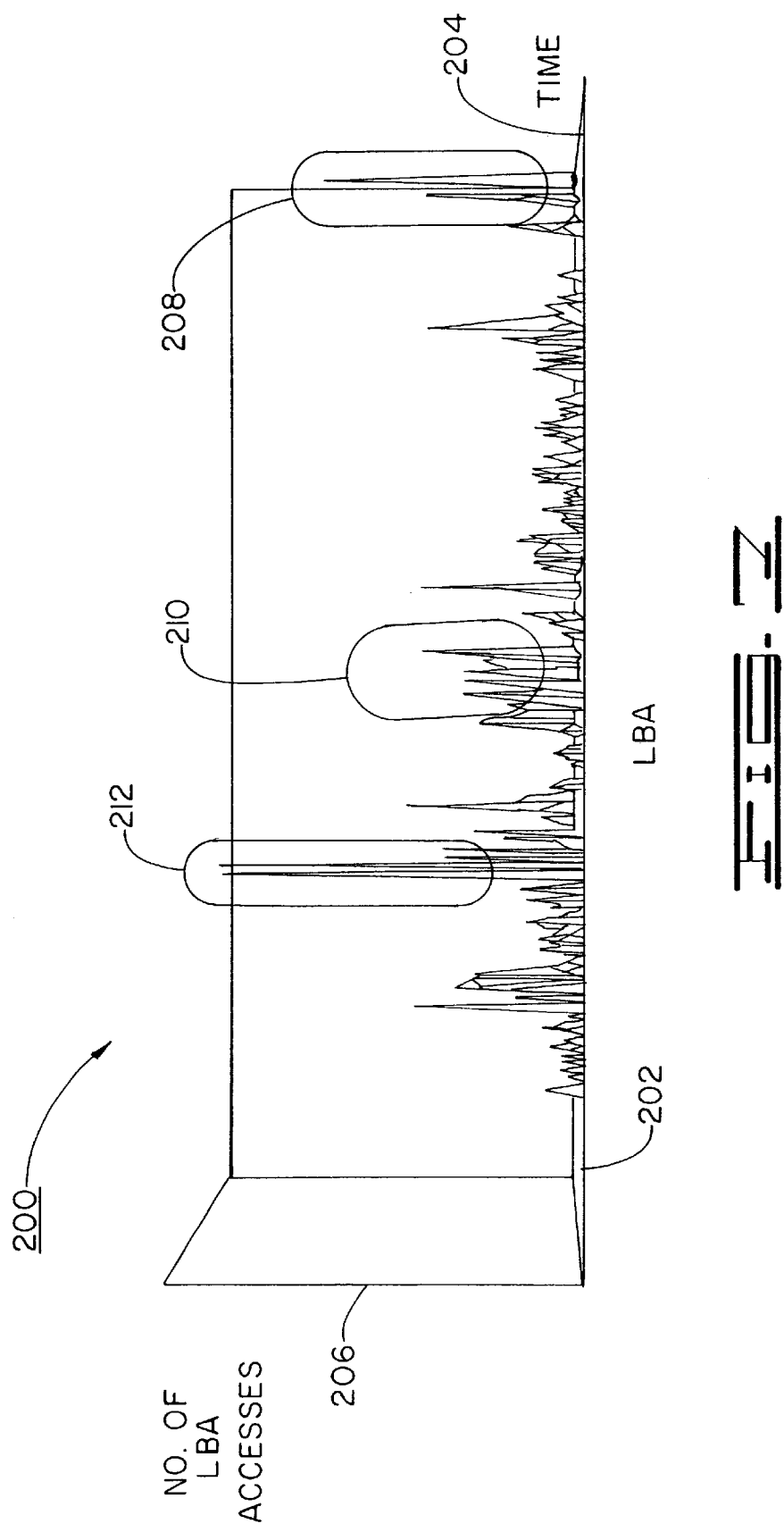
FIG. 7 is a three-dimensional graphical representation of the data of FIG. 6 along another selected viewing angle.

Although the views shown in FIGS. 6 and 7 are provided with the above orientations, it will be understood that the data can be manipulated and displayed in any number of alternative orientations, such as by individual LBA, by individual track, etc., as desired. Different views along the various axes can also be obtained, as desired.

For reference, the minimum LBA accessed was LBA No. 2,140,243 and the maximum LBA accessed was LBA No. 2,296,443. This means that the benchmark accessed LBAs over a range of 156,200 LBAs, which is only about 80 megabytes (MB). Interestingly, since the drive under test had a total storage capacity of 36 gigabytes (GB), the benchmark only accessed about 0.2% of the total drive.

The beginning LBA of 2,140,243 is near the 1 GB boundary, which is in Zone 0 of this particular drive. The entire benchmark test was performed entirely in the outermost zone, which has the highest internal transfer rate and is nearest the partition and FAT tables. The benchmark test was thus apparently designed to evaluate the drive at the highest possible internal transfer rate, as well as to minimize the effects of seeks to read and update the partition and FAT tables (accesses to such tables were omitted from the displayed data).

From FIGS. 6 and 7 it can be readily seen that the benchmark sequence was highly discontinuous in application; that is, some groups of LBAs within the affected range were accessed frequently while others were accessed sparingly or avoided altogether. Of particular interest in FIG. 6 is the presence of groups of highly accessed LBAs respectively identified at 208, 210 and 212. The LBA groups at 208 and 210 received a substantial number of repeated access commands over a substantial duration of the command sequence, and frequent seeks were made back and forth between these two zones. The LBAs in group 212 received numerous accesses in a very short period of time.

Depending upon the types of accesses made and the data stored in these regions, the user can advantageously select (or deselect) the various available run-time parameters for each zone of LBAs. For example, employing more aggressive ROA and RLA settings for the LBAs in groups 208, 210 and 212 would likely result in a higher probability that data blocks about to be requested by the system during the benchmark would already be present in the buffer, allowing faster access time. Write caching might also be employed for certain locations away from these groups so that the drive can spend more consecutive time in the vicinity of these groups (and perform RLA before departing). A user might elect to reduce or completely turn off the use of ROA and RLA for LBAs in other regions where little or no access took place since the access patterns suggest that the data accesses in these regions are more random in nature, and such look ahead strategies might decrease transfer rate.

While the routines of FIGS. 4 and 5 provide three-dimensional representations particularly suited for human interpretation, numerical techniques can also be applied to the data to identify trends and suggest improvements in the access strategy of the disc drive 100. The resulting parametric configuration adjustments are preferably communicated to the disc drive 100 via the bus 154.

It will be apparent that the routines of FIGS. 4 and 5 could enable a disc drive designer to specifically "tune" a set of drives to achieve a better scoring during an officially sanctioned benchmark test. However, a more substantial benefit of the routines is in the ability to analyze specific customer usage and to tune drives specifically for such requirements. That is, seeing where the physical data blocks are actually located on the discs, and being able to see the time and frequency progression of the access operations, advantageously allows a user to evaluate the parametric configuration of the drive in relation to specific workload characteristics.

The routines of FIGS. 4 and 5 are drive independent; that is, any drive make from any manufacturer having the specified interface configuration can readily be evaluated. This is useful in comparison evaluations, as well as in multi-drive arrays having different models of drives. In this latter case, the analysis can occur at the system level, and the data can be broken out by individual drive within the array.

The use of the data acquisition board 156 to directly monitor the commands over the bus 154 has been found advantageous in a design environment. However, the data acquisition board 156 is not necessarily required; the software in the system 140 can readily be configured to monitor requests at the CPU (file) level and make the necessary conversions to identify the requested LBAs during each access. Such modifications are well within the ability of those skilled in the art to implement.

An advantage of this approach is that the disc drive manufacturer can provide a software program to the user on a portable recording medium (such as on a compact disc) without the need for additional hardware. The software program can be executed in a host device in the user environment and allow the user to see the physical movements of the drive over time and make changes to the drive parametric configuration by suitable commands to the drive over the bus 154. The drives in a user environment can then be configured to enter different parametric modes at different times of the day depending upon usage characteristics during the day. For example, ROA and RLA profiles might be set at significantly different levels during random accesses during the day as compared to during tape back up operations in the evening.

In summary, the present invention (as embodied herein and as claimed below) is directed to an apparatus and method for improving data transfer rate performance of a disc drive.

In accordance with preferred embodiments, a disc drive (such as 100) is provided in communication with a host device (such as 140) and configured to store data from the host device in physical data blocks on at least one disc surface (such as 108), the physical data blocks identified by the host device in terms of a corresponding sequence of logical block addresses (LBAs).

The method comprises steps of providing input/output (I/O) commands to the disc drive comprising data access operations each directing the transfer of data between at least one LBA within the disc drive and the host device (such as by steps 162, 172). Communications from the disc drive to the host device are monitored (such as by step 174). A correlation is then made between a time sequence of the I/O commands to the locations of the physical data blocks corresponding to the LBAs accessed by the I/O commands (such as by step 178). At least one data transfer parameter of the disc drive is then adjusted in response to the correlation of time sequence and location of physical data blocks (such as by step 184). Preferably, the data transfer parameter comprises write caching, read on arrival (ROA) or read look ahead (RLA).

Preferably, the data access operations comprise write and read operations, in which data are written to a physical data block corresponding to the at least one LBA and in which data are read from a physical data block corresponding to the at least one LBA, respectively. The monitoring of the communications from the disc drive are preferably carried out using data acquisition circuitry resident on a printed circuit board within the host device.

Moreover, the correlating step preferably comprises a step of generating a three-dimensional histogram plotted against first, second and third orthogonal axes, the first orthogonal axis indicating locations of the physical data blocks, the second orthogonal axis indicating sample interval and the third orthogonal axis indicating frequency of accesses of the physical data blocks. The method further preferably comprises a prior step of obtaining data from the disc drive showing the correlation between the sequence of LBAs and the locations of the corresponding physical data blocks (such as by step 170).

In accordance with other preferred embodiments, a software routine (such as 166) is tangibly stored on a computer readable medium and configured to be loaded into memory (such as 146, 152) of a host computer system (such as 140) in communication with a disc drive (such as 100), the software program facilitating improvement in data transfer rate performance of the disc drive, wherein the disc drive is configured to store data from the host device in physical data blocks on at least one disc surface, the physical data blocks identified by the host device in terms of a corresponding sequence of logical block addresses (LBAs).

The software program is configured to direct the host device to perform steps of providing input/output (I/O) commands to the disc drive comprising data access operations each directing the transfer of data between at least one LBA within the disc drive and the host device (such as by steps 162, 172). Communications from the disc drive to the host device are monitored (such as by step 174). A correlation is then made between a time sequence of the I/O commands to the locations of the physical data blocks corresponding to the LBAs accessed by the I/O commands (such as by step 178), and the program outputs data in response to the correlation of time sequence and location of physical data blocks to identify at least one data transfer parameter that can be adjusted to improve data transfer performance of the drive (such as by step 184). Preferably, the data transfer parameter comprises write caching, read on arrival (ROA) or read look ahead (RLA).

Preferably, the software routine is configured to generate a three-dimensional histogram (such as 200) plotted against first, second and third orthogonal axes (such as 202, 204, 206), the first orthogonal axis indicating locations of the physical data blocks, the second orthogonal axis indicating sample interval and the third orthogonal axis indicating frequency of accesses of the physical data blocks. The method further preferably comprises a prior step of obtaining data from the disc drive showing the correlation between the sequence of LBAs and the locations of the corresponding physical data blocks (such as by step 170).

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for the motor start routine while maintaining the same functionality without departing from the spirit and scope of the invention.

In addition, although the embodiments described herein are generally directed to a data analysis routine for a disc drive, it will be appreciated by those skilled in the art that the routine can be used for other devices to evaluate I/O efficiencies and implement system optimization without departing from the spirit and scope of the claimed invention.

What is claimed is:

1. A method for improving data transfer rate performance of a disc drive in communication with a host device, the disc drive configured to store data from the host device in physical data blocks on at least one disc surface, the physical data blocks identified by the host device in terms of a corresponding sequence of logical block addresses (LBAs), the method comprising steps of:

(a) providing input/output (I/O) commands to the disc drive comprising data access operations each directing the transfer of data between at least one LBA within the disc drive and the host device;

(b) monitoring communications from the disc drive to the host device in response to the I/O commands;

(c) correlating a time sequence of the I/O commands to the locations of the physical data blocks corresponding to the LBAs accessed by the I/O commands; and (d) adjusting at least one data transfer parameter of the disc drive in response to the correlation of time sequence and location of physical data blocks of step (c).

2. The method of claim 1, wherein the data access operations of the providing step (a) comprise a write operation in which data are written to a physical data block corresponding to the at least one LBA.

3. The method of claim 1, wherein the data access operations of the providing step (a) comprise a read operation in which data are read from a physical data block corresponding to the at least one LBA.

4. The method of claim 1, wherein the monitoring of step (b) comprises steps of providing a data acquisition circuit in communication with the disc drive, and using the data acquisition circuit to monitor the communications from the disc drive.

5. The method of claim 1, wherein the correlating of step (c) comprises a step of generating a three-dimensional histogram plotted against first, second and third orthogonal axes, the first orthogonal axis indicating locations of the physical data blocks, the second orthogonal axis indicating sample interval and the third orthogonal axis indicating frequency of accesses of the physical data blocks.

6. The method of claim 1, further comprising a prior step of obtaining data from the disc drive showing the correlation between the sequence of LBAs and the locations of the corresponding physical data blocks.

7. The method of claim 1, wherein the disc drive comprises a memory buffer configured to temporarily store data provided by the host device to be written to the disc surface, and wherein the at least one data transfer parameter adjusted during step (d) comprises a write caching parameter which determines the extent to which the disc drive maintains data to be written to the disc surface in the memory buffer for a nonzero time interval and performs a different data access operation before writing the data to the disc surface.

8. The method of claim 1, wherein the physical data blocks are provided on a number of concentric tracks on the disc surface and are accessed by a controllably positionable head, and wherein the at least one data transfer parameter adjusted during step (d) comprises a read on arrival (ROA) parameter which determines the extent to which, in response to a selected data transfer operation in which data are to be read from a selected physical data block on a target track, the disc drive moves the head to the target track and commences reading data from other physical data blocks which precede the selected physical data block in anticipation of a subsequent data transfer operation to read the data from said other physical data blocks.

9. The method of claim 1, wherein the physical data blocks are provided on a number of concentric tracks on the disc surface and are accessed by a controllably positionable head, and wherein the at least one data transfer parameter adjusted during step (d) comprises a read look ahead (RLA) parameter which determines the extent to which, in response to a selected data transfer operation in which data are to be read from a selected physical data block on a target track at a selected distance from a current track on which the head resides, the disc drive delays movement of the head to the target track and instead reads data from other physical data blocks on the current track in anticipation of a subsequent data transfer operation to read the data from said other physical data blocks.

10. The method of claim 1, wherein the disc drive is operated in a user environment, and wherein the I/O commands of providing step (a) comprise commands issued during the course of operating the disc drive in said user environment.

11. The method of claim 1, wherein the I/O commands of providing step (a) comprise a sequence as part of a benchmark test specifically designed to enable comparison of performance of a number of different disc drives.

12. A software program tangibly stored on a computer readable medium and configured to be loaded into memory of a host computer system in communication with a disc drive, the software program facilitating improvement in data transfer rate performance of the disc drive, wherein the disc drive is configured to store data from the host device in physical data blocks on at least one disc surface, the physical data blocks identified by the host device in terms of a corresponding sequence of logical block addresses (LBAs), the software program configured to direct the host device to perform steps of:

(a) providing input/output (I/O) commands to the disc drive comprising data access operations each directing the transfer of data between at least one LBA within the disc drive and the host device;

(b) monitoring communications from the disc drive to the host device in response to the I/O commands;

(c) correlating a time sequence of the I/O commands to the locations of the physical data blocks corresponding to the LBAs accessed by the I/O commands; and (d) outputting data in response to the correlation of time sequence and location of physical data blocks of step (c) to identify at least one data transfer parameter that can be adjusted to improve data transfer performance of the disc drive.

13. The software program of claim 12, wherein the correlating of step (c) comprises a step of generating a three-dimensional histogram plotted against first, second and third orthogonal axes, the first orthogonal axis indicating locations of the physical data blocks, the second orthogonal axis indicating sample interval and the third orthogonal axis indicating frequency of accesses of the physical data blocks.

14. The software program of step 12, in which the software program further directs the host computer to perform a prior step of obtaining data from the disc drive showing the correlation between the sequence of LBAs and the locations of the corresponding physical data blocks.

15. The software program of claim 12, wherein the disc drive comprises a memory buffer configured to temporarily store data provided by the host device to be written to the disc surface, and wherein the at least one data transfer parameter of step (d) comprises a write caching parameter which determines the extent to which the disc drive maintains data to be written to the disc surface in the memory buffer for a nonzero time interval and performs a different data access operation before writing the data to the disc surface.

16. The software program of claim 12, wherein the physical data blocks are provided on a number of concentric tracks on the disc surface and are accessed by a controllably positionable head, and wherein the at least one data transfer parameter of step (d) comprises a read on arrival (ROA) parameter which determines the extent to which, in response to a selected data transfer operation in which data are to be read from a selected physical data block on a target track, the disc drive moves the head to the target track and commences reading data from other physical data blocks which precede the selected physical data block in anticipation of a subsequent data transfer operation to read the data from said other physical data blocks.

17. The software program of claim 12, wherein the physical data blocks are provided on a number of concentric tracks on the disc surface and are accessed by a controllably positionable head, and wherein the at least one data transfer parameter of step (d) comprises a read look ahead (RLA) parameter which determines the extent to which, in response to a selected data transfer operation in which data are to be read from a selected physical data block on a target track at a selected distance from a current track on which the head resides, the disc drive delays movement of the head to the target track and instead reads data from other physical data blocks on the current track in anticipation of a subsequent data transfer operation to read the data from said other physical data blocks.

* * * * *